United States Patent Office 3,547,961
Patented Dec. 15, 1970

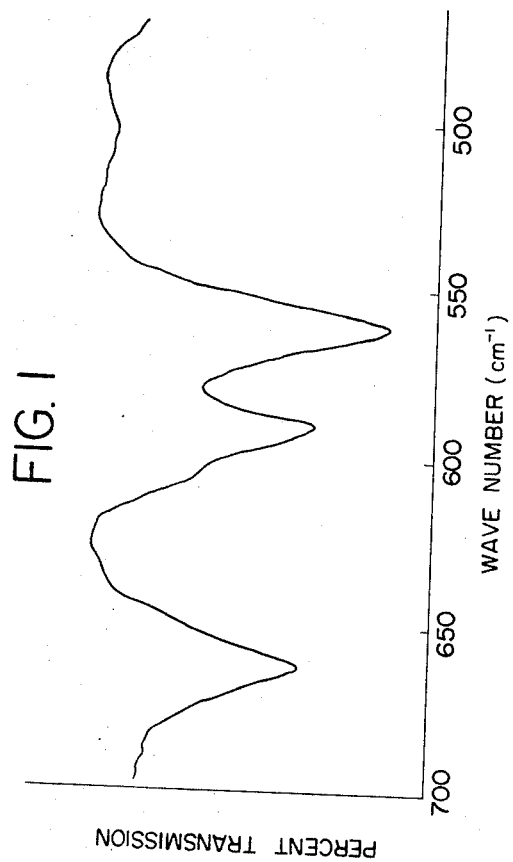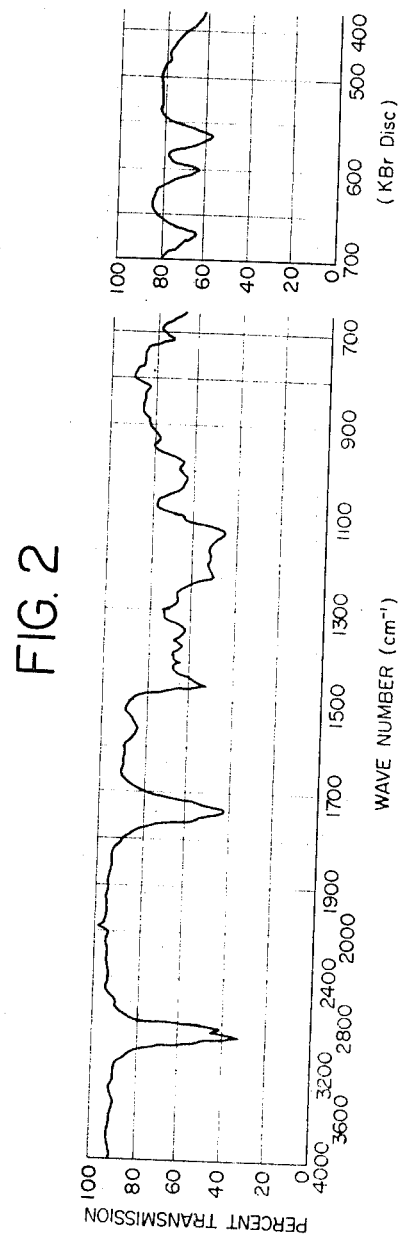

3,547,961
DIMERCAPTIDE DERIVATIVES OF DISTAN-NOXANES OR THIODISTANNOXANES
Mitsuo Onozuka, Tokyo, Toshiaki Nakamura, Kashiwashi, and Kinji Iida, Tokyo, Japan, assignors to Kureha Kagaku Kogyo Kabushiki Kaisha, Tokyo, Japan, a corporation of Japan
Filed Apr. 11, 1968, Ser. No. 720,724
Claims priority, application Japan, Apr. 13, 1967, 42/23,604
Int. Cl. C07f 7/22; C09f 5/08
U.S. Cl. 260—410.6                                     7 Claims

ABSTRACT OF THE DISCLOSURE

A high molecular solid state tin compounds especially adapted for use as thermal stabilizers for chloric or chlorine-containing artificial resins, and having the following general formula:

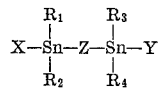

Figure 3:
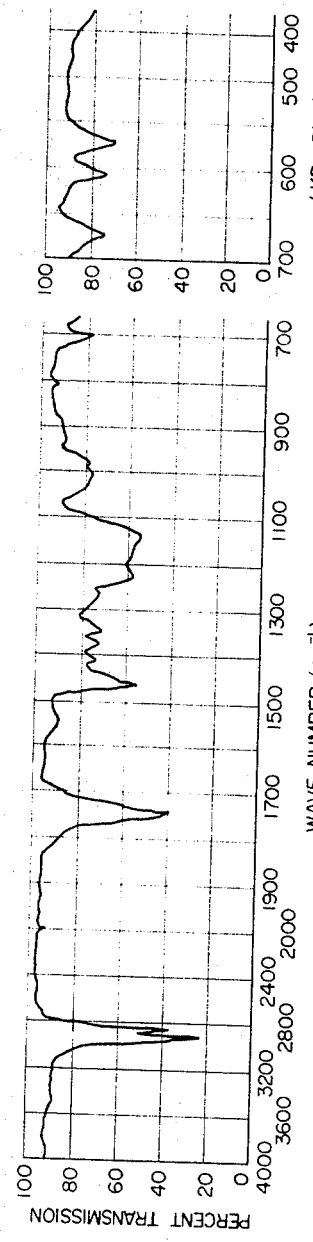

where, $R_1$, $R_2$, $R_3$ and $R_4$ stand for same or different organic radicals having one or more carbon atoms directly bonded to Sn; X and Y stand for the same or different

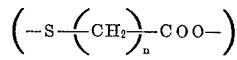

radicals, $n$ being an integer 1 or 2; or more specifically same or different mercapto-radicals of poly-mercapto-acid esters of polyols having sulfur atoms directly bonded to Sn. Z stands for oxygen or sulfur.

---

This invention resides in high molecular solid state tin compounds especially adapted for use as thermal stabilizers for chloric or chlorine-containing artificial resins, and having the following general formula:

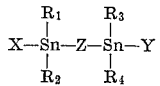

where, $R_1$, $R_2$, $R_3$, and $R_4$ stand for same or different organic radicals having one or more carbon atoms directly bonded to Sn; X and Y stand for same or different

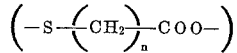

radicals, $n$ being an integer 1 or 2; or more specifically same or different mercapto-radicals of poly-mercapto-acid esters of polyols having sulfur atoms directly bonded to Sn. Z stands for oxygen or sulfur.

These compounds are dimercaptide derivatives of distannoxane or thiodistannoxane and may have a linear, ring, branched or cross-linked structure.

The high molecular solid state tin compounds according to this invention are highly suitable for use as stabilizers against extractive migration and have such superior characteristics to known non-poisonous octyl tin stabilizers. Among others, they have least poisoning effect to human bodies and a remarkable thermo-stabilizing performance. Since the said tin compounds give practically no smell inherent in mercapto-compounds which is a considerable drawback of sulfur-containing tin compounds, they are highly suitable for use as thermal stabilizers for foodstuff package material.

$R_1$, $R_2$, $R_3$ and $R_4$ appearing in the above general formula may be alkyl ($C_1$–$C_{12}$), alkenyl (vinyl or allyl), aryl (phenyl radical and its derivatives), aralkyl (benzyl, phenylethyl, tryl) cycloalkyl (cyclohexyl, 3-methyl cyclohexyl, 3-chlorocyclohexyl and the like). X and Y stand for mercapto-radicals of mercapto-acid esters of same or different polyhydric alcohol. These may be mercapto-radicals of polythiols such as glycol di (thioglycolate), glycol di (3-mercaptopropionate), diethylene glycol di (thioglycolate), diethylene glycol di (3-mercaptopropionate), glycerol tri (thioglycolate), glycerol tri (3-mercaptopropionate), pentaerythritol tetra (thioglycolate), pentaerythritol tetra (3-mercaptopropionate), trimethylolethane tri (thioglycolate), trimethylolethane tri (3-mercaptopropionate), trimethylolpropane tri (thioglycolate), trimethylolpropane tri (3-mercaptopropionate), sorbitol hexa (thioglycolate), sorbitol hexa (3-mercaptopropionate), mannitol hexa (thioglycolate), mannitol hexa (3-mercaptopropionate) and the like. Compounds which have been prepared from polyols esterified partially by organic acids and partially by mercapto-acids.

Solid state tin stabilizers having the aforementioned general formula comprise a mercapto-radical of mercapto-acid ester and oxygen or sulfur bonded to each other per metallic tin atom, and mercapto-acid ester in the form of an ester of polyhydric polyol represents its contained two or more tin atoms connected with each other or one after another, so as to represent a linear, ring, branched for cross-linked structure, thereby providing a kind of cross-linking agent.

When the solid state tin stabilizers compound is used with a chlorine-containing resin such as polyvinyl chloride, several times of thermally stabilizing power as compared with that of the known organic tin dimercaptide stabilizer are obtained, as will be shown later more in detail hereinafter. The solid state tin compound stabilizer having a special structure, so to speak, is practically odorless and has such a remarkable nature that it will not separate out difficult-volatile and ill-smelling substance even when subjected to a thermal influence as at a high temperature resin processing stage which nature is highly different from and superior to that of conventional liquid or solid state sulfur-containing tin stabilizer commercially available and hithertofore commonly utilized as working additive to foodstuff packaging material.

Nowadays commercially available non-poisonous tin stabilizer such as dioctyl tin-S,S'-bis-isooctyl mercapto-acetate has generally an acute toxicity ($LD_{50}$) of about 4 g./kg., while that of the solid state tin stabilizer as obtained in Example 5 to be described amounts to 10 g./kg. or still higher which shows naturally a remarkable progress in the art. Other solid state tin compounds according to this invention (of dioctyl tin series) also show very low toxicity and have generally an acute toxicity ($LD_{50}$) higher than about 10 g./kg.

A further advantage of the high molecule and solid state tin stabilizer according to this invention resides in a good mutual solubility with chlorine-containing resin, thus the stabilizer being capable of favorably and intimately mixing with the resin especially in the course of gel-forming processing stage of the resin, in spite of a high melting point such as about 180° C. of the stabilizer. An addition of plasticizer and/or the like, acting as dispersant additive is not necessary, in this case, for thermal treatment of that kind of resin. It is rather disadvantageous to employ an addition of conventional liquid dispersant additive for that purpose, because adverse effect upon the other properties of the resin under treatment could be invited thereby. More specifically to say, when a small amount of conventional liquid state stabilizer is added to the resin for thermal processing of the latter, such considerable disadvantages as reduction of impact strength of the resin as well as reduction in utilizable temperature range for that purpose will generally be invited, which means naturally a conventional grave difficult problem which has not yet been solved out by those skilled in the art.

It has been found upon our profound practical experiments that an addition of the solid state tin stabilizer according to this invention to the resin in the course of thermal processing thereof that substantially no low temperature embrittlement of the resin and any considerable alteration of secondary transition temperature thereof will not be invited thereby, which means a creation of remarkable additive usable in the course of resin processing at elevated temperatures.

The high molecular solid state tin stabilizer according to this invention may be added in quantities between 0.1–5 parts by weight to the resin to be thermally treated based upon 100 wt. parts thereof, which resin may preerably be polyvinyl chloride; copolymer of the latter with other vinyl monomer, comprising 60 mol percent or higher percentage of polyvinyl chloride, a composition of said polymer and copolymer; a resin mixture comprising said both and further containing an amount of modifier, such as impact strength improving agent or the like, excepting halogen-containing resins.

The weather fastness performance of the stabilizer according to this invention is highly superior to that of conventional liquid state, sulfur-containing stabilizers, although, as commonly known to those skilled in the art, sulfur-containing tin stabilizers are highly defective in this respect. This improved performance constitutes therefore and among others a remarkable feature of the stabilizer according to this invention, which performance can naturally be improved still further by addition of conventional ultraviolet absorbing agent, plasticizer or the like. Selective addition of other processing additives such as lubricant, plasticizer, stabilizer and/or the like may be made in accordance with the desired final properties of the resin to be treated and the processing conditions for the latter, as will be easily thought out commonly by those skilled in the art.

In the following, a preferred process for the manufacture of the high molecular solid state tin stabilizer according to this invention will only briefly be described, which must be construed however to be in no limiting sense of the invention.

The new compounds according to this invention and highly suitable for use as the stabilizer in the aforementioned sense can be prepared by the reaction of the mercapto-radical of a polythiol with an equivalent amount of an organic tin oxide in the form of

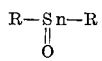

or an organic tin sulfide in the form of

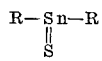

in the presence of an inert solvent such as n-heptane, kerosine, benzene, toluene and/or the like at an elevated temperature under refluxing conditions for several hours so as to subject the reagents to a dehydration and then the solvent is distilled off. In place of said tin oxide, organic tin hydroxide, organic tin alkoxide, or derivatives of tetra-alkyl-1, 3-distannoxane or thiodistannoxane of the following either formula may be used for the synthetic purpose:

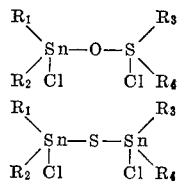

Or alternatively, said oragnic tin oxide and polythiol may be mixed thoroughly together at room temperature or under slightly elevated temperatures for providing the desired product in an easy way, yet with a high yield.

In an alternative way, organic tin oxide and polythiol may be blended separately with chlorine-containing resin under dried conditions and the thus blended separate resin masses are kneaded together on a pair of mixing rolls with the roll peripheral surfaces kept at properly elevated temperatures such as 120–160° C. In the course of this kneading process, the desired organic tin stabilizer is being synthetically formed. It was surprisingly found that the thermal stability of the thus stabilized resin bears comparison with that of the corresponding resin which has been stabilized in the aforementioned manner wherein the resin has been stabilized separately by mixing previously it with the same thermal stabilizer, yet synthesized beforehand.

It is further possible to prepare a reaction compound which has the same composition as that of the organic tin compound according to the invention by providing the known dialkyl-tin-(S,S'-bis-mercapto-acid-ester) - compound with an equimolar dialkyl tin oxide. The thus prepared compound comprises a framework of the distannoxane and has therefore a highly improved thermal stabilizing performance.

It has been further found that for the thermal stabilization of halogen-containing resin, said organic tin oxide and organic sulfur compound having HS-radical may be simultaneously used, thereby providing a potentiatingly improved thermal stability.

In spite of the fact that when the organic tin oxide and the organic sulfur compound are applied individually to the halogen-containing resin, the thermally stabilizing effect thereby attained is only slight, the effect is very remarkable and potentiatingly improved when the substances are used simultaneously. This remarkable effect will not be lost in any way even when the organic tin oxide and the organic sulfur compound are used in combination with anhydrous dibasic acid such anhydrous maleic anhydride. The desired effect will not be obtained when an organic tin chloride such as dibutyl tin chloride in place of the organic tin oxide is used in combination with the organic sulfur compound such as thioglycolic acid.

The remarkable and potentiatingly improved effect obtainable in accordance with the novel teaching proposed by the invention may be maintained with the mol ratio of the organic tin oxide to the organic sulfur compound being selected to a value ranging from 1:0.1 to 1:20, most advantageous 1:1. The reason for this is naturally attributable to the fact that the related two components are brought into reaction with each other to the compound according to this invention.

When the organic tin oxide is used in an excessive amount from the usuable range specified above, an orange yellow color tone will be brought about. When the organic tin oxide is used in its smaller quantity relative to the organic sulfur compound than the recommendable range as above specified, an initial yellow brown coloring effect will be invited to take place which is naturally defective. But, when the amount of usage is kept within the above specified range, a highly efficient thermal stabilizing effect will be assured and substantially no disadvantageous coloring effect will be encountered, even at considerably elevated temperatures.

EXAMPLE 1

24.9 g. of dibutyl tin oxide and 11.9 g. of glycol di (3-mercaptopropionate) were added to 100 ml. of benzene and heated under refluxed conditions for 2 hours for subjecting the reagents to a dehydrating reaction. The reaction proceeded at first in a heterogeneous system, but, with progress of the reaction, reaction products were separated out in the benzene phase in a dispersed state. Upon the separating formation of water in a stoichiometric quantity, benzene and water were distilled off under reduced pressure (10 mm. Hg), a viscous high molecular tin stabilizer of the following structure was obtained. Yield: 98%. M.P.: room temperature to 70° C. index of refraction $n_D^{20}$ 1.5592. Specific gravity: 1.42. Upon measurement of weight decrease inclination on a differential thermo-balance, no appreciable weight variation was observed until 250° C.

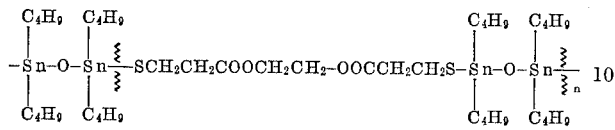

EXAMPLE 2

24.9 g. of dibutyl tin oxide and 12.8 g. of trimethylol ethane tri(3-mercaptopropionate) were added to 100 ml. of benzene and heated under refluxed condition for 2 hours. The reaction proceeded at first in a heterogeneous emulsion system, but, with progress of the reaction, the viscosity of the system increased gradually. Upon the water thus formed being separated out, benzene and water were distilled off under reduced pressure (10 mm. Hg) and a solid state high molecular tin stabilizer having the following branched or cross-linked structure was obtained with a yield of 99%. M.P.: 110–155° C.; $n_D^{20}$ 1.5548; specific gravity: 1.35. Upon measurement of weight reduction inclination on a differential thermo-balance, no appreciable weight variation was observed until 250° C. Any decomposition product or formation of easily volatile substance was not observed.

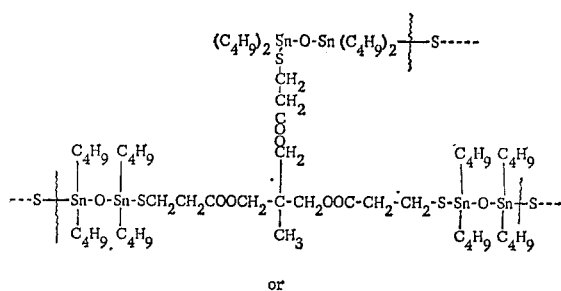

or

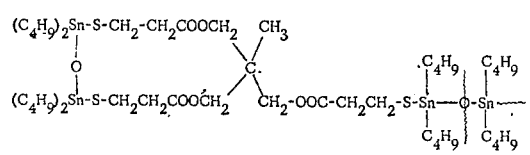

EXAMPLE 3

24.9 g. of dibutyl tin oxide and 12.2 g. of pentaerythritol tetra (3-mercaptopropionate) were added to 100 ml. of toluene and heated under refluxed conditions for 2 hours. The reaction proceeded at first in a heterogeneous emulsion system. Upon ascertained that substantially a stoichiometric quantity of water being separated off, toluene and water were distilled off in vacuo (10 mm. Hg), a solid state high molecular cross-linked tin stabilizer of the following structure was obtained with a yield of 99%. M.P.: 165–180° C.; $n_D^{20}$ 1.5561; specific gravity: 1.40. Upon measurement of weight decrease inclination on a differential thermo-balance, no appreciable weight variation was observed until 250° C.

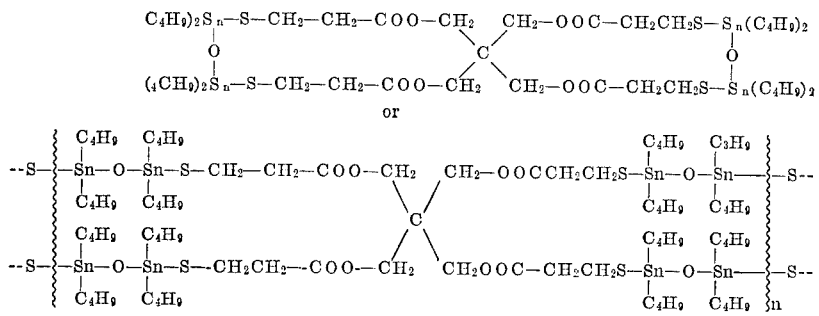

or

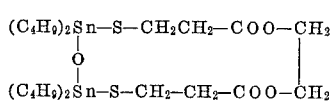

EXAMPLE 4

24.9 g. of dibutyl tin oxide and 12.2 g. of pentaerythritol tetra (3-mercaptopropionate) were put into a mortar and mixed thoroughly together at room temperature. At first, the reaction mixture took the shape of a gelled mass, and, with progress of the reaction, it became a paste which was gradually solidified. Upon kneaded thoroughly for about 10 minutes, the solidified mass was kneaded in a mill to a fine powder. When this powder mass was preserved for a considerably long time, it solidifies itself into a solid block.

The high molecular solid state tin compound thus prepared showed a similar ultra-red absorption spectrum, as shown in FIG. 1, to that of the product obtained in Example 3. As seen from FIG. 1, the absorption (2560 cm.$^{-1}$) of —SH radical of the starting material polythiol has been disappeared. The thermal stabilizing performance of the organic tin compound prepared in this example is shown in Example 29 to be described.

EXAMPLE 5

76.2 g. of dioctyl tin oxide and 25.8 g. of pentaerythritol tetra (3-mercaptopropionate) were added to 100 ml. of toluene and heated under refluxed conditions for 3 hours. Upon removal of a stoichiometric quantity of formed water, the solvent was removed in vacuo (100 mm. Hg). A solid state high molecular tin compound, the molecular weight being 2173, was obtained with a reaction yield higher than 99%. M.P.: 154–157° C.; specific gravity: 1.21; $n_D^{20}$ 1.5308. Upon measurement of weight decrease inclination on a differential thermo-balance, the weight variation was observed at 225° C. to begin. The ultra-red absorption spectrum is shown in FIG. 2 wherein the characteristic zones of distannoxane (565 cm.$^{-1}$; near 600 cm.$^{-1}$) are observed.

It is well supposed that the products are mainly occupied by the following compound and added with a small quantity of its dimer.

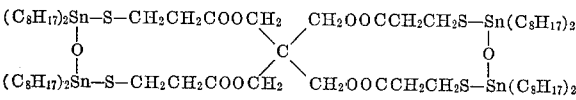

EXAMPLE 6

42.7 g. of stearic acid, 20.4 g. of pentaerythritol and 2 g. of p-toluene sulfonic acid were added to 100 ml. of solvent toluene. The reaction mixture was heated under refluxed conditions for 2 hours to initiate and maintain an esterizing reaction, and then 47.7 g. of 3-mercaptopropionic acid for further continuing the esterizing reaction. Upon acknowledgement of distilling off of substantially stoichiometric quantity of formed water out of the reaction system, the solvent was removed in vacuo (100 mm. Hg).

38.7 g. of the thus prepared monostearyl pentaerythritol tri(3-mercaptopropionate) and 62.9 g. of dioctyl tin oxide were charged into a ceramic mortar, 500 ml. capacity, and mixed thoroughly together at room temperature. After lapse of several minutes of the mixing operation, the paste-like mixture solidified gradually and became difficult to agitate. After solidified, the mass was finely divided by means of a pestle into a powder which was then placed in a constant temperature chamber kept at 60° C. and dried therein for 2 hours in vacuo. 100 mm. Hg. If necessary, the drying step may be omitted without disadvantageously affecting the thermo-stabilizing effect. In the above-mentioned way, the following solid state high molecular tin compound was obtained with a reaction yield higher than 99%. M.P.: 35–83° C.; specific gravity: 1.11; $n_D^{20}$: 1.5140; thermal decomposition point 225° C. An ultra-red absorption spectrum of this compound is shown in FIG. 3. The compound was determined to be same as that obtained in Example 5.

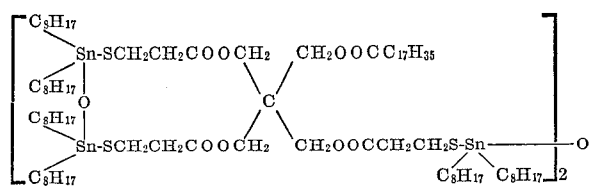

EXAMPLE 7

Figure 4:
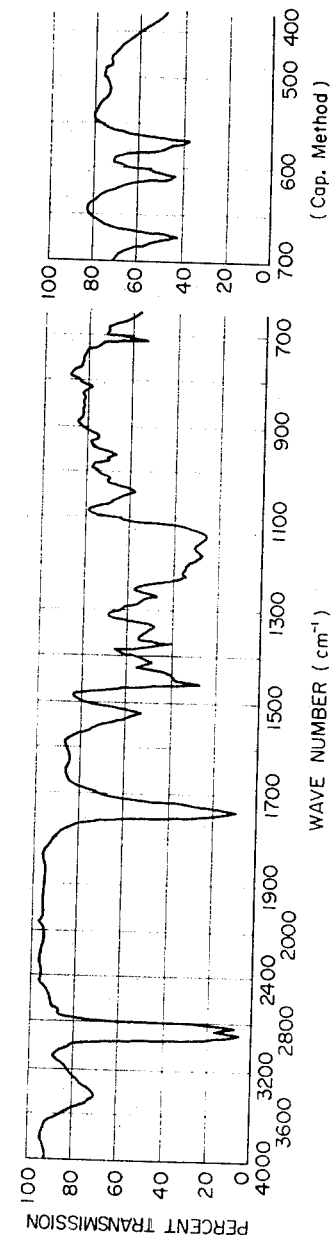

76,7 g. of dioctyl tin oxide and 25.3 g. of ethyleneglycol di(3-mercaptopropionate) were added to 100 ml. of toluene and heated under refluxed conditions for 3 hours for carrying out a dehydrating reaction. Upon removal of substantially a stoichiometric amount of the formed water, the solvent and water were completely removed. In this way, a paste-like compound was obtained with a reaction yield higher than 99%; molecular weight: 855; M.P.: room temperature—70° C.; specific gravity: 1.19; $n_D^{20}$: 1.5248; thermal decomposition point 225° C. An ultra-red absorption spectrum is shown in FIG. 4 from which the following structure may be given:

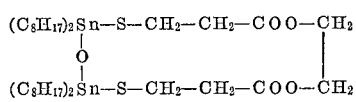

EXAMPLE 8

16.1 g. of pentaerythritol, 67.3 g. of stearic acid and 2 g. of p-toluene sulfonic acid were added to 100 ml. of benzene and heated under refluxed conditions for 2 hours to carry out partial esterification. Next, 25.1 g. of 3-mercaptopropionic acid were added to the reaction mixture so as to complete the esterification. Upon distillating removal of substantially a stoichiometric amount of the formed water from the reaction system, the solvent and water were completely distilled off.

54.6 g. of the thus prepared distearyl pentaerythritol di(3-mercaptopropionate) and 46.7 g. of dioctyl tin oxide were charged into a ceramic mortar, capacity. 500 ml., and then mixed thoroughly together. Upon lapse of several minutes of the mixing procedure, the viscous paste-like mixture increased gradually its viscosity and finally solidified. In this way, a compound of the following structure was obtained:

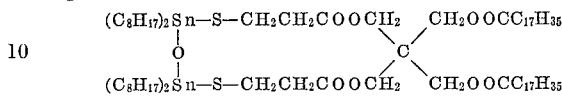

with a reaction yield higher than 99.0%. M.P. 35–85° C.; specific gravity: 1.07; $n_D^{20}$ 1.5080; thermal decomposition point 220° C.

EXAMPLE 9

30.3 g. of dibutyl tin dichloride and 12.2 g. of pentaerythritol tetra(3-mercaptopropionate) were added to 100 ml. of toluene and heated in the presence of acid sodium carbonate (8.4 g.) for 3 hours. In order to complete the reaction, 12 g. of $Na_2S.9H_2O$ are added to the reaction mixture, and a solid state high molecular tin stabilizer of the following structure was obtained with a reaction yield of 98%. M.P. 120–160° C.; $n_D^{20}$ 1.5692; specific gravity 1.45.

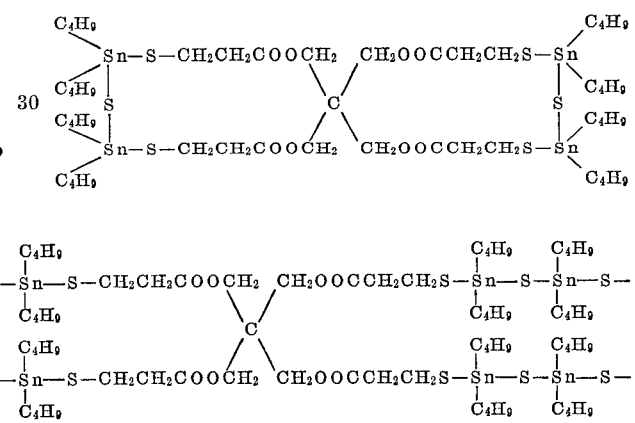

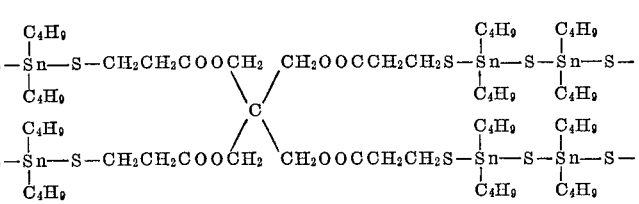

EXAMPLE 10

138 g. of 1,1,3,3-tetrabutyl-1,3-dichloro-1,3-distannoxane (M.P. 112–114° C.), 73 g. of monolauryl pentaerythritol tri(3-mercaptopropionate) and 25 g. of acid sodium carbonate were added to 300 ml. of toluene and heated under refluxing conditions for 3 hours, in order to complete the reaction of the demineralization. After the reaction, removing the separated precipitate and then condensing the solution, the following solid state compound was obtained with a reaction yield higher than 98%. M.P. 50–90° C.; specific gravity:1.30; $n_D^{20}$ 1.5372.

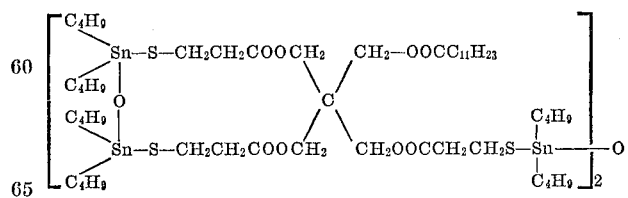

EXAMPLE 11

138 g. of 1,1,3,3-tetrabutyl-1,3-dichloro-1,3-distannoxane, 85 g. of dilauryl pentaerythritol di(3-mercaptopropionate) and 25 g. of acid sodium carbonate were added to 300 ml. of toluene and heated under refluxing conditions for 3 hours in order to complete the reaction of the demineralization. After the reaction, removing the separated precipitate and then condensing the solution, the following solid state compound was obtained with a reaction yield higher than 97%. M. P. room temperature—85° C.; specific gravity:1.17; $n_D^{20}$ 1.5103.

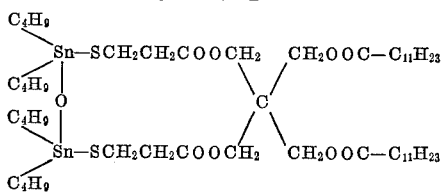

EXAMPLE 12

53.9 g. dibutyl tin oxide and 48.1 g. of monostearyl pentaerythritol tri(3-mercaptopropionate) were charged into a ceramic mortar, 500 ml. capacity, and mixed thoroughly together at room temperature. After lapse of several minutes of the mixing operation, the mixture became paste-like and solidified gradually with the progress of reaction. After solidified, the mass was finely divided by means of a pestle into a powder which was then placed in a constant temperature chamber kept at 60° C., dehydrated and dried for 2 hours. In the above-mentioned way a solid state tin compound was obtained with a reaction yield higher than 98%. M.P. 55–115° C.; specific gravity:1.29; $n_D^{20}$ 1.5325.

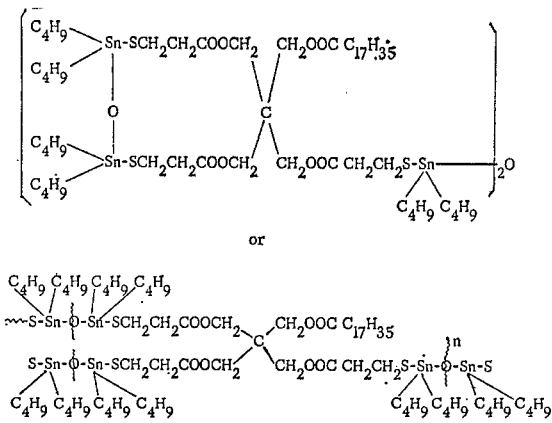

EXAMPLE 13

37.6 g. of dibutyl tin oxide and 63.8 g. of distearyl pentaerythritol di(3-mercaptopropionate) charged into a ceramic mortar, 500 ml. capacity, and mixed thoroughly together at room temperature. After lapse of several minutes of the mixing operation, the mixture became paste-like and solidified gradually with the progress of the reaction. After solidified, the mass was finely divided by means of a pestle into a powder which was then placed in a constant temperature chamber kept at 60° C. dehydrated and dried for 2 hours. In the above-mentioned way a solid state tin compound was obtained with a reaction yield higher than 97%. M.P. room temperature—110° C.; specific gravity:1.04; $n_D^{20}$ 1.5182.

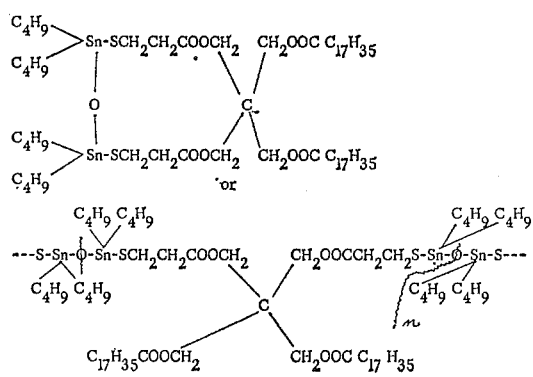

EXAMPLE 14

117 g. of 3-mercaptopropionic acid, 31 g. of sorbitol and 4 g. of p-toluene sulfonic acid were added to 300 ml. of solvent toluene and esterified under refluxing conditions for 4 hours. Upon removal by distillation of a stoichiometric quantity of the formed water, the solvent and water were completely distilled off under reduced pressure (100 mm. Hg).

249 g. of dibutyl tin oxide and 130 g. of the thus prepared sorbitan hexa (3-mercaptopropionate) charged into a ceramic mortar, capacity 500 ml., mixed and kneaded thoroughly together. After lapse of about ten minutes of the mixing and kneading operation, the mass was finely divided into a powder by means of a pestle. In this way, the following solid state tin compound was obtained with a reaction yield higher than 98%. M.P. 96–135° C.; specific gravity: 1.38 $n_D^{20}$ 1.5572.

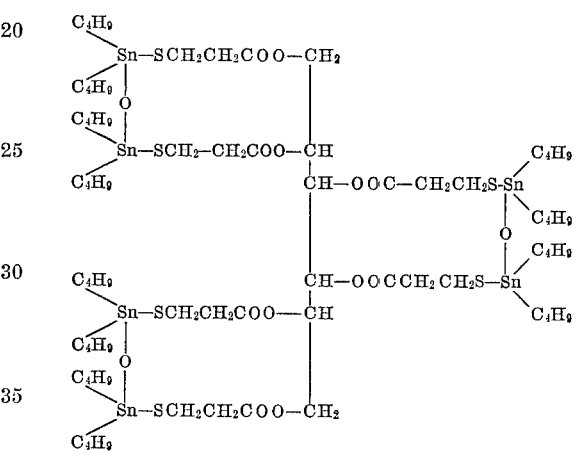

EXAMPLE 15

100 g. of thioglycol, 31 g. of mannitol and 4 g. of p-toluene sulfonic acid were added to 300 ml. of solvent toluene and esterified under refluxing conditions for 4 hours. Upon removal by distillation of a stoichiometric quantity of the formed water, the solvent and water were completely distilled off under reduced pressure (100 mm. Hg).

249 g. of dibutyl tin oxide and 116 g. of the thus prepared mannitol hexa(thioglycolate) charged into a ceramic mortar, capacity 500 ml., mixed and kneaded thoroughly together. After lapse of about 10 minutes of the mixing and kneading operation, the mass was finely divided into a powder by means of a pestle. In this way, a solid state tin compound was obtained with a reaction yield higher than 97%. M.P. 110–155° C.; specific gravity: 1.34; $n_D^{20}$ 1.5497.

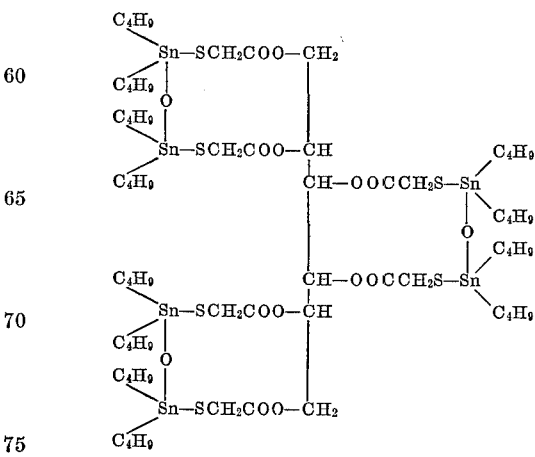

EXAMPLE 16

50 g. of lauric acid, 34 g. of pentaerythritol and 4 g. of p-toluene sulfonic acid were added to 300 ml. of solvent toluene, and heated under refluxing conditions for 2 hours. In order to continue the esterifying reaction, 69 g. of thioglycolic acid were added. Upon removal by distillation of substantially stoichiometric amount of the formed water from the reaction system, the solvent was completely distilled off in vacuo (100 mm. Hg).

88 g. of the thus prepared monolauryl pentaerythritol tri(thioglycolate) and 125 g. of dibutyl tin oxide were charged into a ceramic mortar, capacity being 500 ml. and mixed thoroughly together. Upon lapse of several minutes of the mixing procedure, the reaction mixture solidified through its paste-like intermediate state. The thus solidified mass was finely divided by means of a pestle and the powder was introduced into a constant temperature chamber kept at 60° C. and dried for 2 hours for dehydration. In this way, a solid state high molecular tin compound was obtained with a reaction yield higher than 98%. M.P. 50–110° C.; specific gravity: 1.31; $n_D^{20}$ 1.5392.

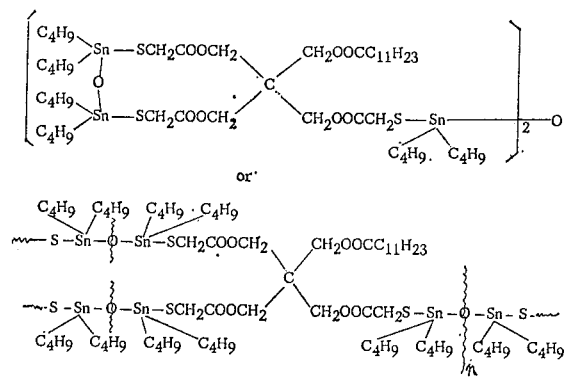

EXAMPLE 17

100 g. of lauric acid, 34 g. of pentaerythritol and 4 g. of p-toluene sulfonic acid were added to 300 ml. of solvent toluene and subjected under refluxing conditions for 2 hours for carrying out the esterification. In order to further continuing the esterification, 46 g. of thioglycol were added to the reaction mixture. Upon removal by distillation of substantially stoichiometric quantity of the formed water from the reaction system, the solvent was completely distilled off in vacuo (100 mm. Hg).

155 g. of the thus formed di-lauryl pentaerythritol di-(thioglycolate) and 125 g. of dibutyl tin oxide were charged into a ceramic mortar, capacity being 500 ml., and mixed thoroughly together at room tempearture. The mixture became within several minutes a paste, harder and harder with progress of the reaction and finally a solid mass, which was finely divided by means of a pestle and dried in a constant temperature chamber kept at 60° C. for 2 hours for careful dehydration, to provide a solid state high molecular tin compound. Reaction yield: higher than 96%. M.P. room temperature—110° C.; specific gravity: 1.17; $n_D^{20}$ 1.5168.

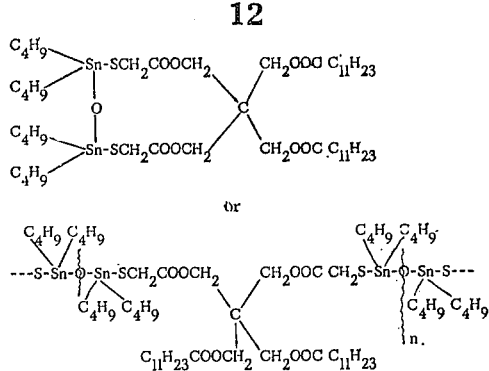

EXAMPLE 18

13 g. of malonic acid, 34 g. of pentaerythritol and 2 g. of p-toluene sulfonic acid were mixed together and subjected for two hours under refluxing conditions to esterification. Then, 87.5 g. of 3-mercaptopropionic acid were added to the reaction mixture for continuing the esterification. Upon removal by distillation of a stoichiometric amount of the formed water from the reaction system, the solvent was completely driven off in vacuo (100 mm. Hg).

14.5 g. of the thus formed dipentaerythritol malonate ramic mortar capacity being 500 ml. and mixed thoroughramic mortar, capacity being 500 ml. and mived thoroughly together at 80° C. for about 30 minutes. Upon elapse of several minutes, the mass took a paste-like state which was then gradually solidified with progress of the reaction and finally turned into a solid. This solid mass was finely divided by means of a pestle and the powder was placed in a constant temperature chamber kept at 60° C. for 2 hours for careful drying and dehydration. Thus, a solid state high molecular tin compound of the following structure was obtained with a reaction yield higher than 98%. M.P. 80–180° C.; specific gravity: 1.36; $n_D^{20}$ 1.5477. In the following formula, $n \geq 1$:

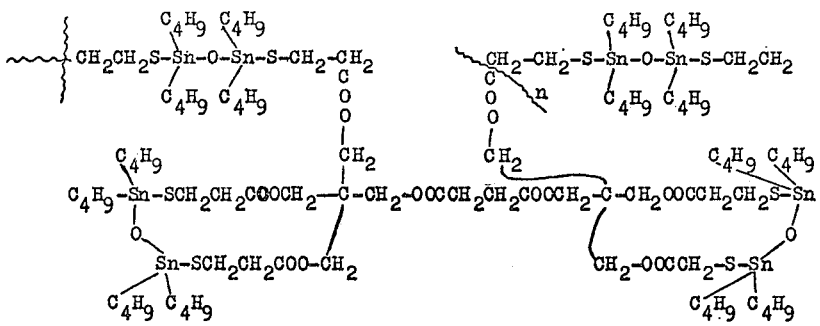

EXAMPLE 19

180 g. of dioctyl tin oxide and 52.5 g. of ethylene glycol di (thioglycolate) were added to 300 ml. of benzene and the mixture was heated under refluxing conditions for 3 hours for dehydration. Upon removal by distillation of a stoichiometric quantity of the formed water, the solvent and water were completely distilled off. In this way, a paste-like compound of the following structure was obtained with a reaction yield higher than 98%. M.P. room temperature—65° C.; specific gravity: 1.23; $n_D^{20}$ 1.5330.

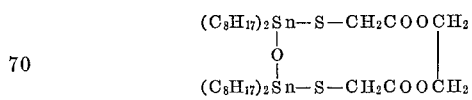

EXAMPLE 20

180 g. of dioctyl tin oxide and 54 g. of pentaerythritol tetra (thioglycolate) were added to 300 ml. of solvent toluene and heated under refluxing conditions for 3 hours. Upon removal by distillation of a stoichiometric quantity of the formed water, the solvent was completely distilled off in vacuo (100 mm. Hg) and a compound of the following structure was obtained with a reaction yield higher than 98%. Molecular weight: 1988; M.P. 146–150° C.; specific gravity: 1.21; $n_D^{20}$ 1.5302.

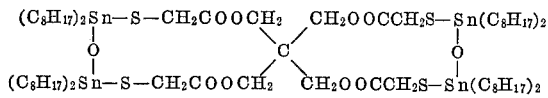

EXAMPLE 21

36.1 g. of dioctyl tin oxide and 12.8 g. of trimethylol ethane tri (3-mercaptopropionate) were added to 100 ml. of solvent toluene and heated under refluxing conditions for 3 hours for carrying out dehydration. Upon removal by distillation of a stoichiometric quantity of the formed water, the solvent and water were completely distilled off. In this way, solid state high-molecular tin compound was obtained with a reaction yield higher than 96%. M.P. 90–140° C.; specific gravity: 1.18; $n_D^{20}$ 1.5288.

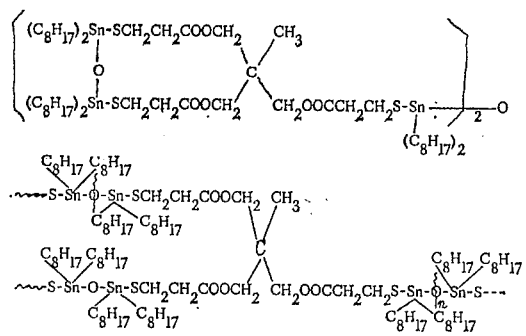

EXAMPLE 22

36.1 g. of dioctyl tin oxide and 11.4 g. of trimethylol ethane tri(thioglycolate) were added to 100 ml. of toluene and heated under refluxing conditions for 3 hours for dehydration. Upon removal by distillation of a stoichiometric quantity of the formed water from the reaction system, the solvent and water were completely driven off in vacuo, a solid state high molecular tin compound was obtained with a reaction yield higher than 98%. M.P. 87–136° C.; specific gravity: 1.22; $n_D^{20}$ 1.5317.

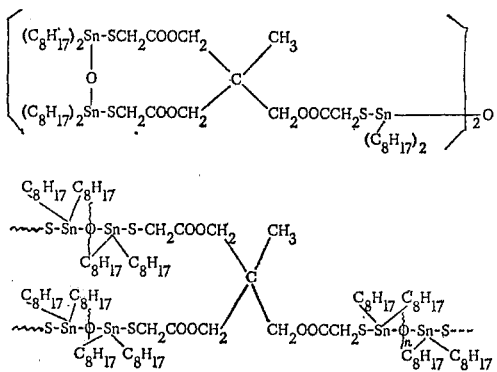

EXAMPLE 23

23.4 g. of pentaerythritol and 34.4 g. of lauric acid were added to 300 ml. of solvent benzene with 4 g. of p-toluene sulfonic acid and the mixture was heated under refluxing conditions for 2 hours to subject it to partial esterification. In order to complete the esterification, 54.6 g. of 3-mercaptopropionic acid were added. Upon removal by distillation of substantially a stoichiometric quantity of the formed water, the solvent and water were completely driven off in vacuo.

35.6 g. of the thus formed monolauryl pentaerythritol tri(3-mercaptopropionate) and 66.2 g. of dioctyl tin oxide were charged into a ceramic mortar, capacity being 500 ml., and thoroughly mixed together at room temperature.

Upon elapse of several minutes of the mixing procedure the original viscous slurry-like mixture became gradually still further viscous and solidified through the paste-like state into a solid mass. The reaction yield amounted higher than 98%. M.P. 48–86° C.; specific gravity: 1.12; $n_D^{20}$ 1.5179. The structure of the thus obtained new compound is:

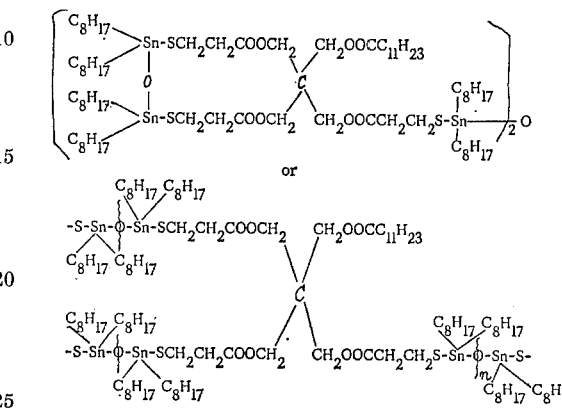

EXAMPLE 24

20.1 g. of pentaerythritol, 59.2 g. of lauric acid and 4 g. of p-toluene sulfonic acid were added to 300 ml. of solvent benzene and the mixture was heated under refluxing conditions for 2 hours for partial esterification. For completing the esterification, 31.4 g. of 3-mercaptopropionic acid were added to the reaction mixture. Upon removal by distillation of the formed water from the reaction system, the solvent and water were completely driven off in vacuo. 49.0 g. of the thus formed dilauryl pentaerythritol di (3-mercaptopropionate) and 52.4 g. of dioctyl tin oxide were charged into a ceramic mortar, capacity being 500 ml., and mixed thoroughly together at room temperature. Upon elapse of several minutes of the mixing procedure, the paste-like mixture became gradually more viscous and finally solidified into a solid mass. In this way, a solid state high molecular tin compound was obtained with a reaction yield higher than 99%. M.P. room temperature—67° C.; specific gravity: 1.08; $n_D^{20}$ 1.5090.

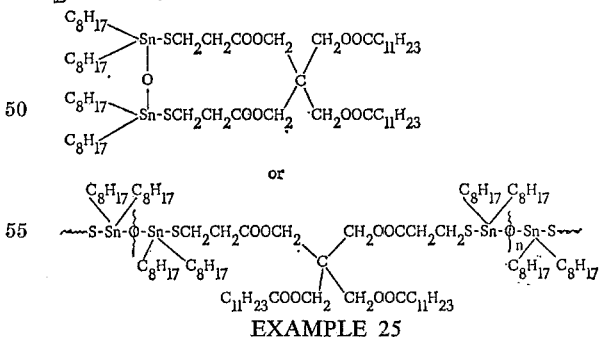

EXAMPLE 25

Comparative test 1

121.6 of dibutyl tin dichloride and 99 g. of glycol dimercaptopropionate were added to 500 ml. of solvent benzene and heated in the presence of acid sodium carbonate (67.2 g.) under refluxing conditions for 2 hours. Upon removal by filtration of the thus sedimented sodium chloride as well as the remaining acid sodium carbonate, the solvent was distilled off in vacuo and then a liquid state high molecular tin compound of the following structure was obtained with a yield of 98%.

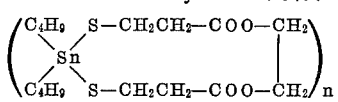

where, $n$ is an integer 1 or 2.

EXAMPLE 26

Comparative test 2

182.4 g. of dibutyl tin dichloride and 153 g. of trimethylol ethane tri(3-mercaptopropionate) were added to 500 ml. of solvent benzene and heated in the presence of acid sodium carbonate (101 g.) under refluxing conditions for 2 hours. Upon removal by filtration of the thus sedimented sodium chloride as well as the remaining acid sodium carbonate, the solvent was distilled off in vacuo and then a solid state high molecular tin compound of the following structure was obtained with a yield of 95%.

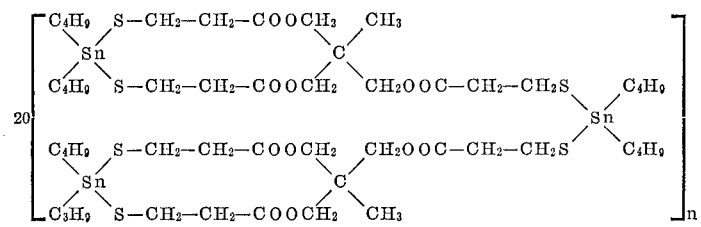

where, $n$ is an integer 1 or 2.

EXAMPLE 27

Comparative test 3

243 g. of dibutyl tin dichloride and 196 g. of pentaerithritol tetra(3-mercaptopropionate) were added to 500 ml. of solvent benzene and heated in the presence of acid sodium carbonate (134 g.) under refluxing conditions for 2 hours. Upon removal by filtration of the thus sedimented sodium chloride as well as the remaining acid sodium carbonate, the solvent was distilled off in vacuo and then a solid state high molecular tin compound of the following structure was obtained with a yield of 98%.

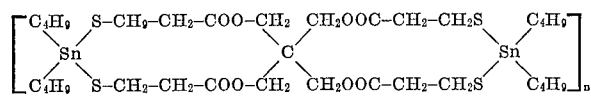

where, $n$ is an integer 1 or 2.

EXAMPLE 28

Stabilizer test 1

1 wt. part of each of the thermal stabilizers A1–A4 and comparative A1–A4, listed in the following Table 1 was blended with 100 wt. parts of suspension-polymerized, commercially available polyvinyl chloride ($\bar{p}$ 800) and then the blended resin was kneaded thoroughly on a roll mixer kept at 150° C. for about 2 minutes and fabricated to a sheet, about 1 mm. thick. The resin sheet was introduced in a constant temperature chamber kept at 180° C. for carrying out each case a long period test on static thermal stability. As may be well judged from the results listed in the table, the solid state high molecular tin compounds (refer to A1–A4) according to this invention represent highly superior performance in long period thermal stability to those of conventional comparative sulfur-containing tin compounds (refer to comparative A1–A4).

The rolled sheet was cut into small pieces (sizes: such as 5 cm. x 5 cm.). Three sheets of these cut pieces were stacked one after another and placed between two chromium-plated, 1 mm.-thick steel sheets. The assembly thus prepared was then put on a testing press machine and pressurized with 50 kgs./cm.$^2$ at 190° for 10 minutes. Then, the assembly was taken out from the machine and subjected to blending and observed by naked eyes for possible whitening. It was ascertained that all of the test samples (A1–A4) conditioned by the stabilizers according to this invention showed practically no whitening.

TABLE I

| Nomination of samples | Resin, polyvinyl chloride ($\bar{p}$ 800) (parts) | Stabilizer (parts) | Degree of decoloration upon heated at 180° C. under pressure for several minutes: | | | | | Remarks, mercaptan smell |
|---|---|---|---|---|---|---|---|---|
| | | | 0 | 15 | 30 | 45 | 60 | |
| A-1 | (100) | Example 1 (1) | Colorless | Colorless | Colorless | Colorless | Yellowish | None. |
| A-2 | (100) | Example 2 (1) | do | do | do | do | do | Do. |
| A-3 | (100) | Example 3 (1) | do | do | do | do | do | Do. |
| A-4 | (100) | Example 9 (1) | do | do | do | do | do | Do. |
| Comparative: | | | | | | | | |
| A-1 | (100) | Example 25 (1) | do | Yellowish | Yellow | Brown | Brown | Considerable. |
| A-2 | (100) | Example 26 (1) | do | do | do | do | do | Do. |
| A-3 | (100) | Example 27 (1) | do | do | do | do | do | Do. |
| A-4 | (100) | Dibutyl-tin-bis (S,S'-butyl-3-mercapto-butyl-3-mercaptopropionate) (1). | do | do | do | do | do | Do. |

EXAMPLE 29

Stabilizer test 2

100 wt. parts of a shock-proof resin prepared from 90 parts of suspension-polymerized, commercially available polyvinyl chloride ($\bar{p}$ 800) conditioned with 10 wt. parts of butadiene-styrene-methylmethacrylate copolymer (modifier) were added with 0.75 wt. part of the thermal stabilizer prepared in Example 3 or 5 and comparatively tested with similar samples conditioned with conventional comparative stabilizers. The results are listed in the following Table 2.

In this table, samples B1–B2 which were conditioned with respective organo-tin compounds represented highly superior thermal stabilizing performance to those of conventional samples Comparative B1–B3. It was remarkably found that the samples B-1 and B-2 conditioned with the stabilizer according to this invention, but prepared in highly different modes, showed substantially similar results.

TABLE 2

| Nomination of samples | Resin (parts) | Stabilizer (parts) | Degree of decoloration upon heated at 190° C. under pressure for several minutes: | | |
|---|---|---|---|---|---|
| | | | 5 | 10 | 15 |
| B-1 | Polyvinyl chloride (90), butadiene-styrene-methylmethacrylate copolymer (10). | Example 3 (0.75) | Colorless | Colorless | Yellowish. |
| B-2 | do | Example 4 (0.75) | do | do | Do. |
| Comparative: | | | | | |
| B-1 | do | Dibutyl-tin-bis-maleate (0.75). | Yellowish | Yellow | Brown. |
| B-2 | do | Example 26 (0.75) | do | do | Yellow. |
| B-3 | do | Example 27 (0.75) | do | do | Do. |

EXAMPLE 30

Toxicity and smell test

Results of several comparative tests on samples of polyvinyl chloride ($\bar{p}$ 800) conditioned with the organo-tin compounds and conventional comparative non-toxic stabilizers are shown in the following Table 3. The tests were made in the similar way as mentioned hereinbefore in Example 28. In this table, acute toxicity values ($LD_{50}$) of the organo-tin compounds are also shown.

The acute toxicity was measured upon culture of a certain number of rats for two weeks after oral dosing of each compound. Each test was made on 4 batches of rats, each batch consisting of 10 rats. The listed toxicity is the means value of 4-batch tests. With a dose of 10 g./kg. of each of the solid state organo-tin compound prepared by the process described in Examples 5, 6, 19, 20, 21, 22, 23 and 24, mortality was found nil, which means amazingly superior to those of conventional comparative non-toxic thermal stabilizers, and therefore the novel organo-tin compounds are highly suitable for use as conditioners for foodstuff packaging synthetic film materials, The low molecular distannoxane compound, comparative C-4 in the table, is better in its long period thermal stability than the solid state organo-tin compounds according to this invention, but is considerably inferior in its toxicity and ill smell than the inventive compounds.

EXAMPLE 31

A composition consisting of 100 wt. parts of suspension-polymerized and commercially available polyvinyl chloride ($\bar{p}$800) conditioned with the stabilizer, 1 wt. part, prepared in Example 6 or 8 and epoxidized soya bean oil, 2 parts, was extruded in its fused state from a blow extruder to provide a number of colorless and transparent bottles, and tests were made upon these hollow products for continuous workability, small-issuance and softening point (according to the Japanese Industrial Standards JISK–6745). The results are shown in a comparative way, in the following Table 4. In this table, sample: comparative D–1 contained a conventional tin-compound known as non-poisonous tin stabilizer.

Practically no smell was sensed from blown bottles with use of the novel stabilizers prepared in Examples 6 and 8, while in the case of sample D–1, considerable mercaptan smell was sensed. It was further found that with the solid state organic tin compounds according to the invention, the secondary transition temperature of the resin under test was subject to substantially no alteration. On the contrary, if conventional organic liquid tin-compounds were used in such quantities as to obtain similar stabilizing effect as with use of the novel stabilizers, the secondary transition was considerably decreased.

TABLE 3

| Nomination of samples | Resin, polyvinyl chloride ($\bar{p}$ 800) (parts) | Stabilizer (parts) | Acute toxicity, $LD_{50}$ (g./kg.) | Degree of decoloration upon heated at 190° C. under pressure for several minutes: | | | Remarks: mercaptan smell |
|---|---|---|---|---|---|---|---|
| | | | | 10 | 15 | 20 | |
| C-1 | (100) | Example 5 (1) | (¹) | Colorless | Colorless | Yellowish | None. |
| C-2 | (100) | Example 6 (1) | (¹) | do | do | do | Do. |
| C-3 | (100) | Example 7 (1) | 8.5 | do | do | do | Do. |
| C-4 | (100) | Example 19 (1) | (¹) | do | Yellowish | Yellow | Do. |
| C-5 | (100) | Example 20 (1) | (¹) | do | do | do | Do. |
| C-6 | (100) | Example 21 (1) | (¹) | do | Colorless | Yellowish | Do. |
| C-7 | (100) | Example 22 (1) | (¹) | do | Yellowish | Yellow | Do. |
| C-8 | (100) | Example 23 (1) | (¹) | do | do | do | Do. |
| C-9 | (100) | Example 24 (1) | (¹) | do | Yellow | Brown | Trace. |
| Comparative: | | | | | | | |
| C-1 | (100) | di-n-octyl-tin-bis(S,S'-diisooctylmercapto-acetate) (1). | 2-4 | Yellowish | Brown | Blackish brown | Smelled. |
| C-2 | (100) | di-n-octyl-tin-bismaleate polymer (1) | 4.6 | Yellowish | Yellowish brown | do | Maleate smell. |
| C-3 | (100) | 1,1',3,3'-tetraoctyl-1, 3-S,S'-dibutyl-3-mercaptopropionate-1,3-distannoxane (1). | 1-2 | Colorless | Colorless | Yellowish | Smelled. |
| C-4 | (100) | 1,1',3,3'-tetraoctyl-1,3-S,S'-dioctyl-3-mercaptopropionate-1,3-distannoxane (1). | 4.6 | Colorless | Colorless | Yellowish | Smelled. |

¹ Over 10.

TABLE 4

| Nomination of sample | Constituents of composition (parts) | Cont. workability | Smell from blown bottles | Softening temperature (Tf ° C. |
|---|---|---|---|---|
| D-1 | PVC ($\bar{p}$ 800) (100); stabilizer of example 6 (1); epoxydized soya bean oil (2). | Better | Odorless | 74 |
| D-2 | PVC ($\bar{p}$ 800) (100); stabilizer of example 8 (1); epoxydized soya bean oil (2). | Yellowish decolored products. | do | 74 |
| Comparative: | | | | |
| D-1 | PVC ($\bar{p}$ 800) (100); di-n-octyle-tin-bis(S, S'-diisooctyl-mercaptoacetate) (2); epoxydized soya bean oil (2). | do | Mercaptan smell. | 67 |

EXAMPLE 32

A composition consisting of 85 wt. parts of suspension-polymerized and commercially available polyvinyl chloride (p̄ 800) admixed with 15 wt. parts of vinyl chloride (91)—cetyle vinyl ether (9) as copolymer component was blended with 1 wt. part of a novel and a conventional thermal stabilizer (refer to El-3 and comparative E-1 to 5 in the following Table 5), respectively, for comparison.

This blended mass was then mixed carefully together on a roll mixer kept at 150° C. at about 2 minutes, and transformed into a sheet, about 1 mm. thick.

In the progress of this mixing and sheet-forming process, the novel compound was formed synthetically and acted as the stabilizer.

The sheet was introduced into a constant temperature chamber kept at 180° C. for performing a continuous and static workability test.

The reaction in this case (only referring to sample E-1) may be expressed as follows:

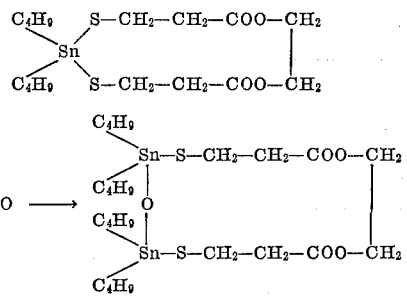

The results are listed in the following Table 5.

In this table, test results are also listed where conventional stabilizers prepared in Examples 25–27 were added with dialkyl tin oxide to provide corresponding novel solid state tin-compounds as stabilizers (refer to samples El-3).

Conditioned with these stabilizers, the samples were tested on continuous workability.

Comparing the results with those of samples comparative E-1 to 6 the former showed superior stabilizing performance.

More specifically, the addition of dialkyl tin oxide to dimercapto-tin-compound in an equivalent quantity to the tin contained therein, will amazingly improve the desired performance.

EXAMPLE 33

The solid state high molecular tin compound mentioned in the foregoing Example 5 was tested on long period thermal stabilization effect. Test samples F-1, F-2, and F-3 shown in the following Table 6 were prepared for comparison in three ways. Sample F-1 was prepared in the regular synthetic process; F-2 was prepared from the starting materials: dioctyl tin oxide and pentaerithritol tetra 3-mercaptopropionate were mixed together in a mortar at room temperature, while F-3 was prepared by blending them directly with polyvinyl chloride. The results are shown in the following Table 6. As seen from this table, it was surprisingly found that there was substantially no change in the long period thermal stabilizing effect among these three differently prepared samples.

TABLE 5

| Nomination of samples | Resin | Parts | Stabilizer (parts) | Degree of decoloration upon heated at 180° C. under pressure for several minutes: | | | | |
|---|---|---|---|---|---|---|---|---|
| | | | | 0 | 15 | 30 | 45 | 60 |
| E-1 | PVC (p̄ 800) Polyvinyl chloride (91)-cetylvinyl ether (9)-copolymer. | (85) (15) | Product of Example 25 (0.65); dibutyl-tin-oxide (0.35). | Colorless | Colorless | Colorless | Colorless | Yellowish |
| E-2 | Same as above | (85) (15) | Product of Example 26 (0.66); dibutyl-tin-oxide (0.34). | do | do | do | do | Do. |
| E-3 | do | (85) (15) | Dibutyl-tin-oxide (1) | do | do | do | do | Do. |
| Comparative: | | | | | | | | |
| E-1 | do | (85) (15) | Product of Example 25 (1) | do | Yellowish | Yellow | Brown | Brown. |
| E-2 | do | (85) (15) | Product of Example 26 (1) | Colorless | do | do | do | Do. |
| E-3 | do | (85) (15) | Product of Example 27 (1) | do | do | do | do | Do. |
| E-4 | do | (85) (15) | Dibutyl-tin-bis (S,S'-dibutyl-3-mercaptopropionate). (1). | do | do | do | do | Do. |
| E-5 | do | (85) (15) | Dibutyl-tin-oxide (1) | do | Yellow | Brown | Blackish | Brown. |

TABLE 6

| Nomination of samples | Resin, polyvinyl chloride (p̄ 800) (parts) | Man condition of stabilizer (parts) | Degree of decoloration upon heated at 190° C. under pressure for several minutes: | | |
|---|---|---|---|---|---|
| | | | 10 | 20 | 30 |
| F-1 | (100) | Example 5 (1) | Colorless | Yellowish | Yellow. |
| F-2 | (100) | Mixing at room temperature (1) | do | do | Do. |
| F-3 | (100) | Blend with resin (1) | do | do | Do. |

EXAMPLE 34

Each of solid state high molecular tin compounds G1–G9 and Comparative G1–G4 mentioned in the following Table 7 was tested in the similar way as in the case of Example 28. In the present case, howevr, the pressing temperature was 190° C. in place of 180° C.

The small sheets stacks were tested in the similar way with varying pressing periods and possible decoloration was observed.

The results are listed in Table 8.

TABLE 7

| Nomination of sample | Resin, polyvinyl-chloride (p 1000) (parts) | Stabilizer (parts) | Degree of decoloration upon heated at 190° C. under pressure for several minutes: | | | |
|---|---|---|---|---|---|---|
| | | | 5 | 10 | 15 | 20 |
| G-1 | (100) | Example 10(1) | Colorless | Colorless | Colorless | Yellowish. |
| G-2 | (100) | Example 11(1) | do | do | Yellow | Orange. |
| G-3 | (100) | Example 12(1) | do | do | Colorless | Yellowish. |
| G-4 | (100) | Example 13(1) | do | do | Yellow | Brown. |
| G-5 | (100) | Example 14(1) | do | do | Colorless | Yellowish. |
| G-6 | (100) | Example 15(1) | do | do | Yellow | Orange. |
| G-7 | (100) | Example 16(1) | do | do | do | Do. |
| G-8 | (100) | Example 17(1) | do | Yellowish | do | Brown. |
| G-9 | (100) | Example 18(1) | do | Colorless | Colorless | Yellowish. |
| Comparative: | | | | | | |
| G-1 | (100) | Example 25(1) | do | Yellowish | Yellow | Brown. |
| G-2 | (100) | Example 26(1) | do | do | do | Do. |
| G-3 | (100) | Example 27(1) | do | do | do | Do. |
| G-4 | (100) | Dibutyl-tin-bis(S,S'-octyl-thioglycolate). | do | do | do | Do. |

As will be clearly seen from Table 8, comparative samples H–1 and H–2 where two component materials

TABLE 8

| Nomination of samples | Resin PVC (p 1000) (parts) | Stabilizer (parts) | Degree of decoloration upon heated at 190° C. under pressure for several minutes: | | |
|---|---|---|---|---|---|
| | | | 5 | 15 | 25 |
| H-1 | (100) | Di-n-octyl-tin-oxide (0.72); octyl-3-mercaptopropionate (0.28). | Colorless | Colorless | Yellowish. |
| H-2 | (100) | Di-n-octyl-tin-oxide (0.76); ethylene glycol-di(3-mer-captopropionate) (0.25). | do | do | Do. |
| H-3 | (100) | Di-n-octyl-tin-oxide (0.74); trimethylol ethane-tri(3-mer-captopropionate) (0.26). | do | do | Do. |
| H-4 | (100) | Di-n-octyl-tin-oxide (0.75); pentaerythritol-tetra(3-captopropionate) (0.26). | do | do | Do. |
| Comparative: | | | | | |
| H-1 | (100) | 1,1,3,3-tetraoctyl-1,3-S,S'-octyl-3-mercaptopropionate-1,3-distannoxane (1). | do | do | Do. |
| H-2 | (100) | Product of Ex. 7 (1) | do | do | Do. |
| H-3 | (100) | Product of Ex. 21 (1) | do | do | Do. |
| H-4 | (100) | Product of Ex. 5 (1) | do | do | Do. |
| H-5 | (100) | Di-n-octyl-tin-oxide (1) | Brown | Brown | Blackish Brown. |
| H-6 | (100) | Octyl-3-mercaptopropionate (1) | do | Blackish Brown | Do. |
| H-7 | (100) | Pentaerythritol-tetra(3-mercaptopropionate) (1) | do | do | Do. |

EXAMPLE 35

Novel organic tin compounds obtained in the foregoing Examples 5, 7, 21 and the like, and several conventional comparative thermal stabilizers were tested in the similar way as in the foregoing.

More specifically, an organic sulfur compound such as oxo-octyl-3-mercaptopropionate, ethylene glycol - di-3-mercaptopropionate, trimethylol ethanetri - 3 - mercaptopropionate, pentaerythritol - tetra - 3 - mercaptopropionate and dioctyl tin oxide in its equi-molar quantity to SH-radical of the organic sulfur compound were blended to a resin which was subjected to a kneading step in the course of which the desired organic tin-compound was synthetically formed and used for the thermal stabilization of the resin.

On the other hand, the same compound prepared in the regular process was blended in the similar way and used for the same stabilizing purpose.

The results of the both cases are shown in the following Table 8.

In each of the former tests, the starting materials were blended with a certain quantity of polyvinyl chloride and processed on a roll kneader, kept at 150° C., for about 2 minutes, and transformed into a sheet, about 0.5 mm. thick, which was then cut into small pieces having certain dimensions such as 5 cm. x 5 cm.

4 pieces were inserted between a pair of chromium-plated pressure plates and then pressed on a testing press at 190° C. under 50 kgs./cm.² were blended separately which materials were same as employed in samples H–1 to H–4 blended with the resin to be stabilized thermally, showed no desired effect.

On the contrary, when the component materials which were separately blended to the resin, said materials being same as those which were used for the preparation of the corresponding stabilizers in samples comparative H–3 to H–6 and in the same mixing ratio, there was substantially no appreciable difference in the desired stabilizing effect in the both cases.

What we claim is:

1. Solid state high molecular weight organic tin compound having the formula

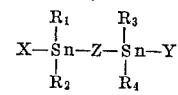

wherein $R_1$, $R_2$, $R_3$ and $R_4$ are each an alkyl radical having 1 to 12 carbon atoms directly bonded to the tin atom; X and Y are each a mercapto-radical of a polyhydric mercapto-acid ester of a polyol having a sulfur atom directly bonded to tin; and Z is a member selected from the group consisting of oxygen and sulfur.

2. Organic tin compound as set forth in claim 1, wherein at least one of said alkyl radical is selected from the group consisting of butyl and n-octyl.

3. Organic tin compound as set forth in claim 1, wherein said polyol is a member selected from the group consisting of ethylene glycol, trimethylol ethane, pentaerythritol, mannitol and sorbitol.

4. Organic tin compound as set forth in claim 1, wherein said polyol is a partially esterized aliphatic acid $C_1$–$C_{18}$ selected from the group consisting of pentaerythritol mono- and distearate, pentaerythritol mono- and dilaurate and pentaerythritol mono-and diacetate.

5. Organic tin compound as set forth in claim 1, wherein said mercapto-acid is thioglycolic acid.

6. Organic tin compound as set forth in claim 1, wherein said mercapto-acid is 3-mercaptopropionic acid.

7. Process for the manufacture of a dialkyl tin compound comprising reacting a mixture of a dialkyl tin oxide and a mercapto acid ester in a mol ratio of Sn/S of 1:1 in the presence of an inert solvent at elevated temperature for dehydration.

References Cited
UNITED STATES PATENTS

| | | | |
|---|---|---|---|
| 2,809,956 | 10/1957 | Mack et al. | 260—429.7X |
| 2,870,119 | 1/1959 | Leistner et al. | 260—429.7X |
| 2,872,468 | 2/1959 | Leistner et al. | 260—429.7 |
| 3,069,447 | 12/1962 | Mack | 260—429.7 |
| 3,293,273 | 12/1966 | Gloskey | 260—429.7 |
| 3,396,185 | 8/1968 | Hechenbleikner et al. | 260—429.7 |
| 3,115,509 | 12/1963 | Mack | 260—429.7 |

TOBIAS E. LEVOW, Primary Examiner

W. F. W. BELLAMY, Assistant Examiner

U.S. Cl. X.R.

260—45.75, 429.7